(12) United States Patent
Munson (10) Patent No.: US 7,878,303 B2
(45) Date of Patent: Feb. 1, 2011

(54) LUBRICATION SCAVENGE SYSTEM

(75) Inventor: John Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 240 days.

(21) Appl. No.: 11/939,096

(22) Filed: Nov. 13, 2007

(65) Prior Publication Data

US 2008/0110699 A1    May 15, 2008

Related U.S. Application Data

(60) Provisional application No. 60/865,679, filed on Nov. 14, 2006, provisional application No. 60/865,680, filed on Nov. 14, 2006.

(51) Int. Cl.
*F01D 25/18* (2006.01)
*F01M 1/12* (2006.01)

(52) U.S. Cl. .................. 184/6.11; 184/11.2; 184/11.4; 184/13.1; 184/6.23; 184/6.24; 60/39.08; 384/462; 384/473; 384/474; 415/111; 415/115; 415/176

(58) Field of Classification Search .............. 184/6.121, 184/6.12, 6.26, 11.4, 107; 701/100, 101; 123/200; 60/39.08, 226.3; 415/110, 111, 415/175, 176; 277/427
See application file for complete search history.

(56) References Cited

U.S. PATENT DOCUMENTS

| 2,650,671 | A | | 9/1953 | Brickett |
| 3,393,024 | A | * | 7/1968 | Rhodes et al. ............. 384/316 |
| 3,531,935 | A | | 10/1970 | Poucher |
| 3,614,257 | A | | 10/1971 | Campbell |
| 4,339,160 | A | | 7/1982 | McHugh |
| 4,344,506 | A | | 8/1982 | Smith |
| 4,378,197 | A | * | 3/1983 | Cattaneo et al. ............. 415/175 |
| 4,422,821 | A | | 12/1983 | Smith |
| 4,525,995 | A | | 7/1985 | Clark |
| 4,531,358 | A | | 7/1985 | Smith |

(Continued)

FOREIGN PATENT DOCUMENTS

EP    1544417 A2    6/2005

(Continued)

OTHER PUBLICATIONS

Weinstock, Vladimir D., et al., Modeling Oil Flows in Engine Sumps: Drop Dynamics and Wall Impact Simulation, pp. 1-19, 2002 American Institute of Aeronautics and Astronautics, Inc.

(Continued)

*Primary Examiner*—Robert A Siconolfi
*Assistant Examiner*—San Aung
(74) *Attorney, Agent, or Firm*—Ray Meiers; Meiers Law Office LLC (57) ABSTRACT

A method and apparatus for scavenging lubricant is disclosed herein. In the invention, a rotating structure is encircled within a sump housing and subjected to lubrication. The sump housing collects high-momentum lubricant flow and low-momentum lubricant flow. The interior of the sump housing is separated into a plurality of chambers with at least one dynamic seal. The at least one dynamic seal extends between the sump housing and the rotating structure to isolate the high-momentum lubricant flow from the low-momentum lubricant flow.

6 Claims, 6 Drawing Sheets

U.S. PATENT DOCUMENTS

| | | | |
|---|---|---|---|
| 4,576,001 A | 3/1986 | Smith | |
| 4,599,979 A | 7/1986 | Breckenfeld et al. | |
| 4,683,389 A | 7/1987 | Readman et al. | |
| 4,683,714 A | 8/1987 | Thebert | |
| 4,683,984 A | 8/1987 | Cohen et al. | |
| 4,756,664 A | 7/1988 | Cohen et al. | |
| 4,824,264 A | 4/1989 | Hoebel | |
| 4,858,427 A | 8/1989 | Provenzano | |
| 5,106,209 A | 4/1992 | Atkinson et al. | |
| 5,121,815 A | 6/1992 | Francois et al. | |
| 5,183,342 A | 2/1993 | Daiber et al. | |
| 5,261,751 A | 11/1993 | Heinz | |
| 5,489,190 A | 2/1996 | Sullivan | |
| 5,494,355 A | 2/1996 | Haase | |
| 5,584,650 A | 12/1996 | Redmond et al. | |
| 5,813,214 A | 9/1998 | Moniz et al. | |
| 6,330,790 B1 | 12/2001 | Arora et al. | |
| 6,438,938 B1 | 8/2002 | Burkholder et al. | |
| 6,516,618 B1 | 2/2003 | Bock | |
| 6,623,238 B2 | 9/2003 | Langston et al. | |
| 6,672,102 B1 | 1/2004 | Huenniger et al. | |
| 6,682,222 B2 | 1/2004 | Fisher | |
| 6,996,968 B2 | 2/2006 | Peters et al. | |
| 7,021,912 B2 | 4/2006 | Tsuchiya et al. | |
| 2004/0156729 A1 | 8/2004 | Waterworth et al. | |
| 2005/0132710 A1 | 6/2005 | Peters et al. | |
| 2005/0166570 A1 | 8/2005 | Granitz et al. | |
| 2006/0002645 A1 | 1/2006 | Swainson | |
| 2006/0033289 A1* | 2/2006 | Gaebler et al. | 277/427 |
| 2006/0037302 A1 | 2/2006 | Peters et al. | |
| 2006/0037325 A1 | 2/2006 | Peters et al. | |
| 2006/0054408 A1 | 3/2006 | Swainson | |
| 2006/0081419 A1 | 4/2006 | Care et al. | |
| 2006/0213726 A1* | 9/2006 | Gekht et al. | 184/11.4 |

FOREIGN PATENT DOCUMENTS

| | | |
|---|---|---|
| GB | 638 | 1/1915 |
| GB | 638 | 9/1915 |
| GB | 976054 | 11/1964 |
| GB | 1050391 | 12/1966 |
| JP | 2005180427 A | 7/2005 |

OTHER PUBLICATIONS

Canino, James V., Characterization of the Turbulent Windage in an Annulus and Its Incorporation Into Two Sump Design Codes, pp. i-x and pp. 1-75, Dec. 2002.

Glahn, A., et al., Feasibility Study on Oil Droplet Flow Investigations Inside Aero Engine Bearing Chambers-PDPA Techniques in Combination With Numerical Approaches, Journal of Eng. for Gas Turbines and Power, Oct. 1996, vol. 118, pp. 749-755.

Wittig, S., et al., Influence of High Rotational Speeds on Heat Transfer and Oil Film Thickness in Aero-Engine Bearing Chambers, Journal of Engineering for Gas Turbines and Power, Apr. 1994, vol. 116, pp. 395-401.

Shimo, Masayoshi, et al., Modeling Oil Flows on Seal Runners and Engine Sump Walls, Journal of Engineering for Gas Turbines and Power, Oct. 2005, vol. 127, pp. 827-834.

Glahn, A., Two-Phase Air/Oil Flow in Aero Engine Bearing Chambers: Characterization of Oil Film Flows, Journal of Engineering for Gas Turbines and Power, Jul. 1996, vol. 118, pp. 578-583.

* cited by examiner

*Fig-9*

LUBRICATION SCAVENGE SYSTEM

CROSS-REFERENCE TO RELATED APPLICATIONS

This application claims the benefit of U.S. Provisional Patent Application Ser. No. 60/865,679 for a LUBRICATION SCAVENGE SYSTEM, filed on Nov. 14, 2006, and also claims the benefit of U.S. Provisional Patent Application Ser. No. 60/865,680 for a LUBRICATION SCAVENGE SYSTEM, filed on Nov. 14, 2006; both are hereby incorporated by reference in their entireties.

BACKGROUND OF THE INVENTION

1. Field of the Invention

The invention relates to a system for scavenging lubricant from a lubricated component that supports a structure rotating at relatively high speed such as, for example, a shaft or bearing of a turbine engine.

2. Description of Related Prior Art

Structures rotating at relatively high speeds are found in many operating environments including, for example, turbine engines for aircraft and for power generation, turbochargers, superchargers, and reciprocating engines. The rotating structures in these operating environments are often supported by lubricated components such as bearings. Other components in these environments can also receive lubricant, including seal runners and gears. A stationary structure, such as a sump, is often disposed to surround the lubricated component to collect the lubricant expelled from the lubricated component.

The performance and life of the lubricant can be enhanced if the expelled lubricant is removed from the sump relatively quickly. When the expelled lubricant resides in the sump for a relatively extended period of time, the lubricant may be undesirably churned and rapidly overheated which degrades the desirable tribological properties of the lubricant. The life of the lubricated components can in turn be enhanced if the performance and life of the lubricant is enhanced.

In many conventional lubrication systems, lubricant is supplied to the lubricated components under pressure and the system then relies on gravity to drain the lubricant from the sump. The flow of lubricant away from lubricated components can be complicated in airborne applications since the attitude of the lubricated components can change and negate the effects of gravity on the flow of lubricant.

SUMMARY OF THE INVENTION

In summary, the invention is an apparatus and method for scavenging lubricant. In the invention, a rotating structure is encircled within a sump housing and subjected to lubrication. The sump housing collects high-momentum lubricant flow and low-momentum lubricant flow. The interior of the sump housing is separated into a plurality of chambers with at least one dynamic seal. The at least one dynamic seal extends between the sump housing and the rotating structure to isolate the high-momentum lubricant flow from the low-momentum lubricant flow. The separation of the high momentum flow of lubricant from the low momentum flow of lubricant allows the high momentum to be used to enhance the flow of lubricant out of the sump housing. Otherwise, the relatively high momentum of the high momentum flow would be dissipate upon mixing with the relatively low momentum of the low momentum flow.

BRIEF DESCRIPTION OF THE DRAWINGS

A detailed description of an exemplary embodiment of the invention is set forth below and is made in connection with the accompanying drawings.

DETAILED DESCRIPTION OF EXEMPLARY EMBODIMENTS

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Lubricant flow in a sump housing can include both high momentum flow and low momentum flow. For example, a quantity of lubricant such as a droplet can be expelled from a rotating component in the sump housing like a projectile. If the droplet-projectile of lubricant can travel directly to the inner surface of the sump housing, the droplet-projectile of lubricant will reach the inner surface with a relatively high amount of momentum.

On the other hand, another quantity of lubricant can be forced to move along a torturous path to reach the inner surface of the sump housing. For example, lubricant that is directed to bearings may be injected between the inner and outer races to rolling elements such as rollers in the form of balls or cylinders. Generally, lubricant cannot be flung off the rollers to the inner surface of the sump housing because of the outer race of the bearing. Specifically, the outer race of the bearing blocks a direct path between the rollers and the inner surface. Other structures associated with the bearing can also block the path, such as structures that support the outer race. Lubricant momentum can be lost when the lubricant is forced to change directions abruptly. Thus, lubricant passing from a roller of a bearing to the inner surface can reach the inner surface with relatively low momentum.

Interior regions of a sump housing in which lubricant flow is relatively high or is relatively low can also be distinguished based on the relative radii between the inner surface of the sump housing and the outer surface of the rotating structure. For example, as the ratio between the radius of inner surface of the sump housing to the radius of the rotating shaft decreases, moving air or windage can transmit a greater force to the lubricant film on the inner surface of the sump housing, resulting in the lubricant having relatively higher momentum or in the lubricant experiencing increasing momemtum. Windage is the profile of air disposed within the sump housing that is itself urged in motion by rotation of the shaft. The flow field of the windage can be determined by solving standard turbulent flow equations in either closed form or by using commercial CFD software. The velocity of the windage at the intersection with lubricant (the lubricant film height) will be some fraction of the tangential portion of the angular velocity of the rotating shaft at its periphery. In operation, as the ratio between the radius of inner surface of the sump housing to the radius of the rotating shaft decreases, windage becomes dominant and imparts more momentum to the lubricant. For example, a relatively small shaft in a relatively large sump housing will result in relatively lower-strength windage and less momentum imparted to lubricant on the inner surface of the sump housing. On the other hand, a relatively large shaft in a relatively small sump housing will result in relatively higher-strength windage and more momentum imparted to lubricant on the inner surface of the sump housing.

The paragraphs above set forth examples of structural arrangements that play a role in the generation of both high momentum and low momentum lubricant flows in a sump housing: (1) the nature of the path followed by the lubricant between the rotating structure and the sump housing and (2) the ratio between the radii of the inner surface of the sump housing and the outer surface of the rotating structure. However, other structure features may play a role in the level of momentum that lubricant possesses on the inner surface of the sump housing prior to scavenge. Any structural arrangement that can result in the generation of both high momentum and low momentum lubricant flows in a sump housing is contemplated by the present invention. In addition, the terms "high" and "low" as applied to lubricant momentum are relative; the present invention contemplates that a difference in momentum between any two flows of lubricant can be utilized for scavenging purposes.

Figure 1:
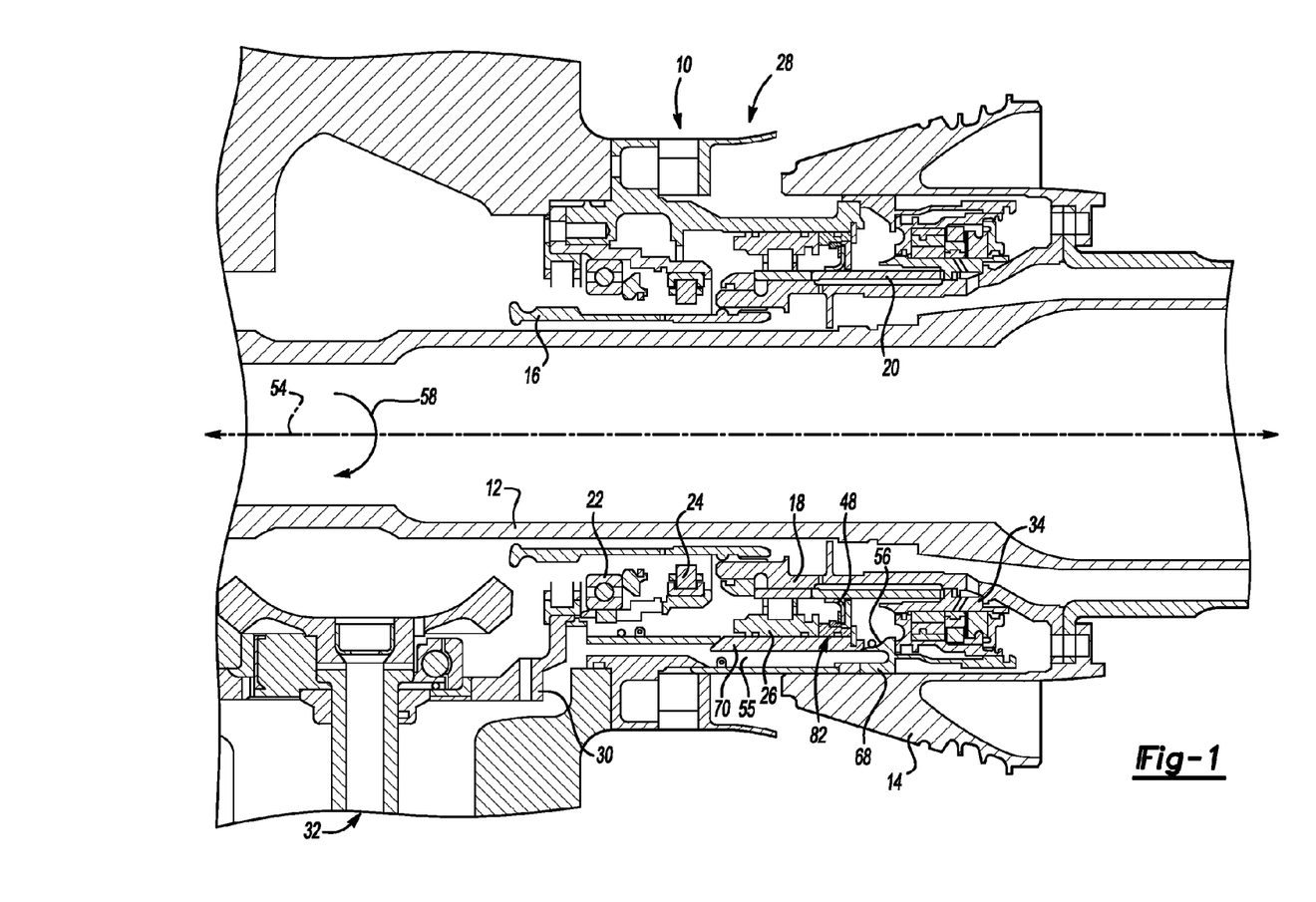
FIG. 1 is a cross-sectional view of an operating environment according to one embodiment of the invention.
Figure 2:
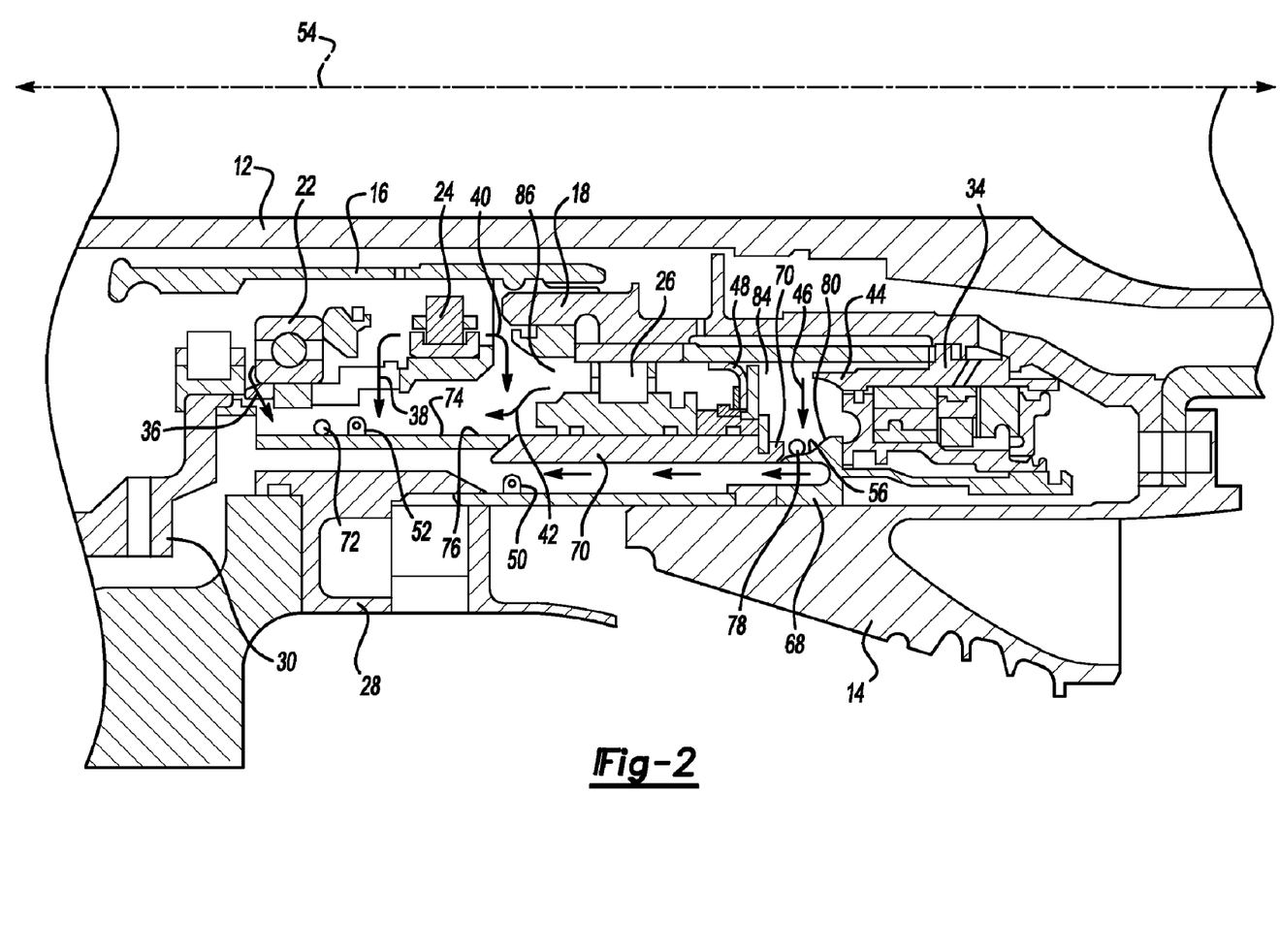
FIG. 2 is portion of FIG. 1 increased in size to enhance the clarity of lubricant flow paths according to the first disclosed embodiment of the invention.
Figure 3:
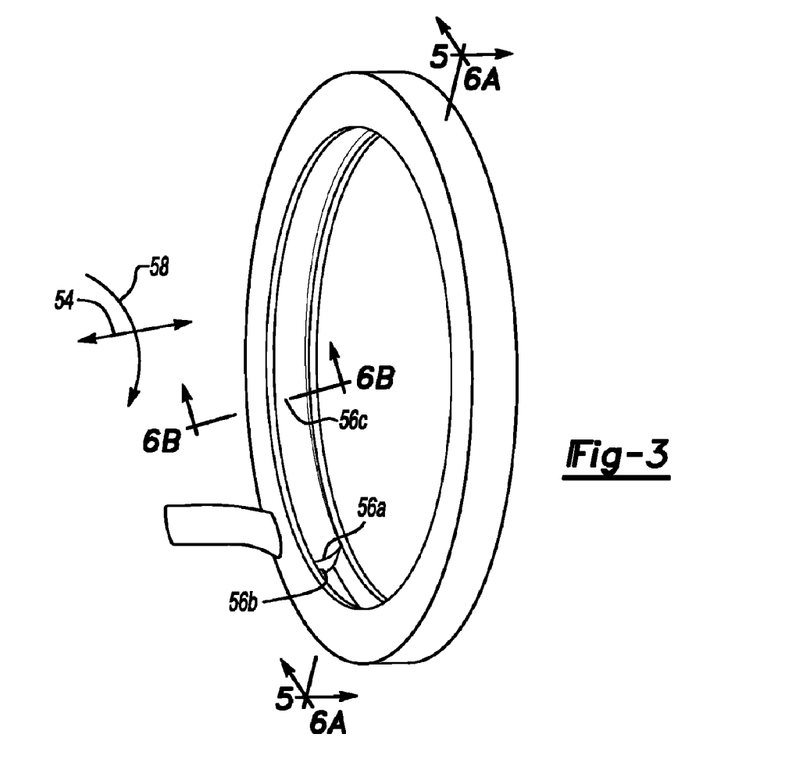
FIG. 3 is a perspective view a scroll device according to a second exemplary embodiment of the invention.
Figure 4:
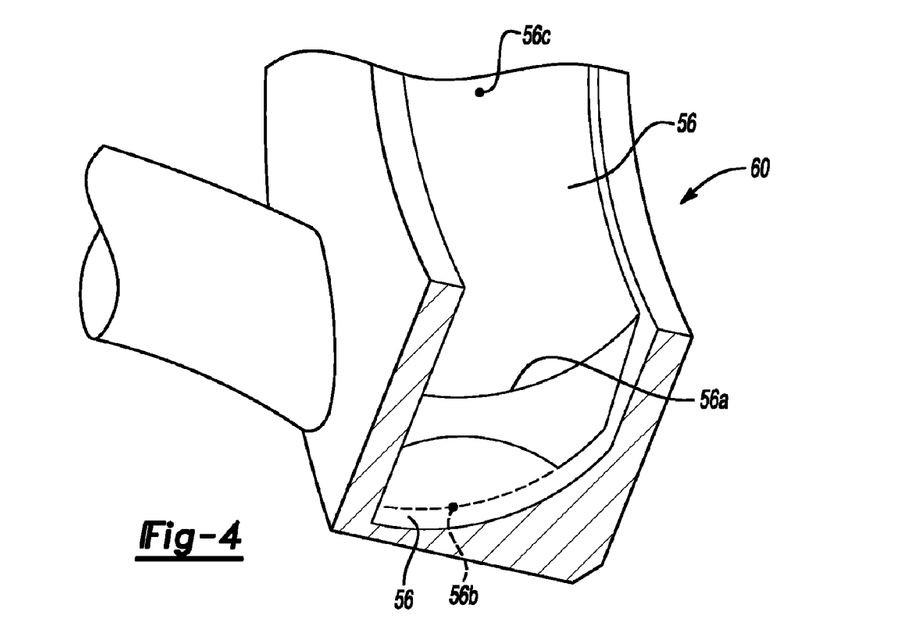
FIG. 4 is a perspective cut-away of the scroll device shown in FIG. 3 showing the bottom dead center position of the exemplary embodiment of the invention.
Figure 5:
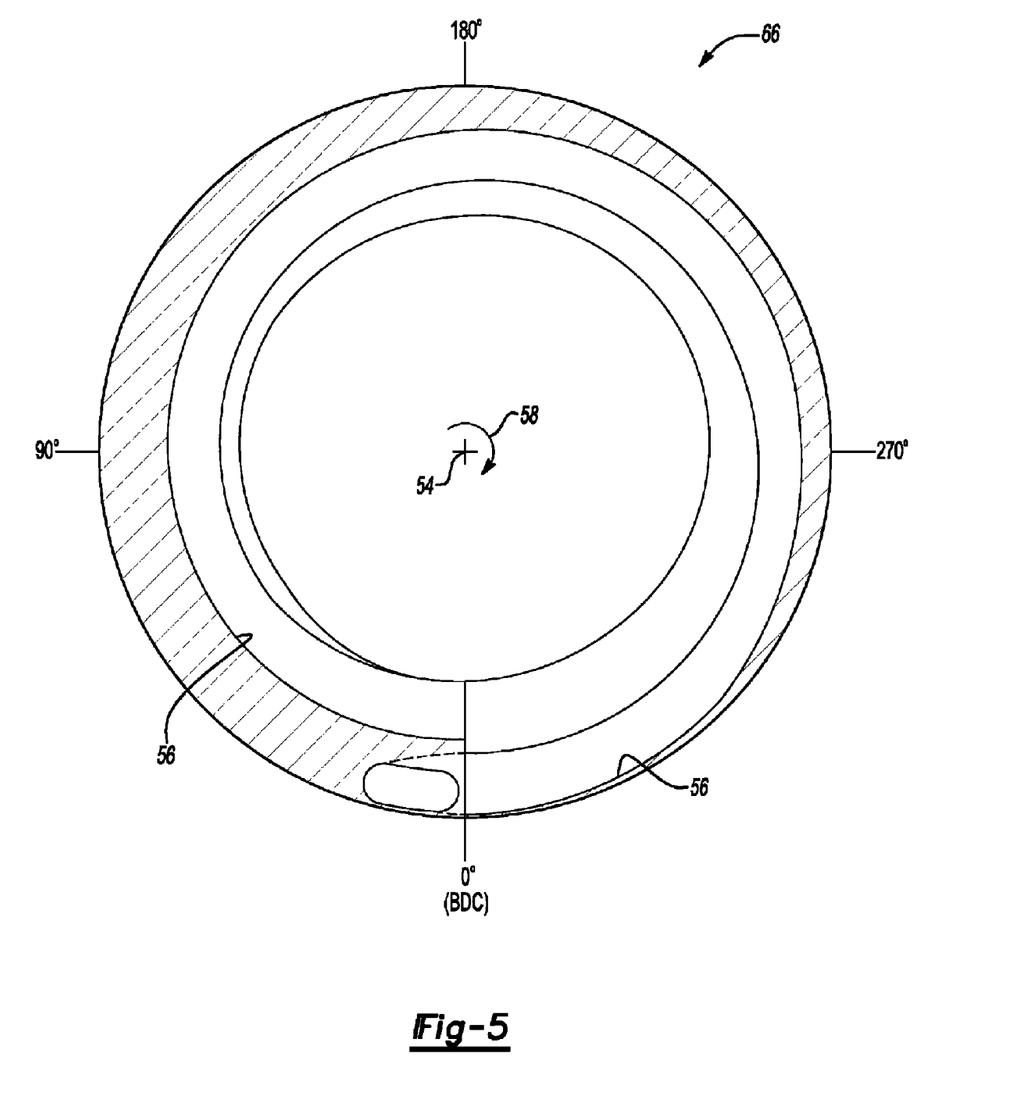
FIG. 5 is a cross-sectional view of the scroll device taken along section lines 5-5 in FIG. 3.

FIGS. 1 and 2 show in cross-section one embodiment of the invention wherein torturous and obstructed lubricant paths are defined. A turbine engine 10 includes several components that rotate together, including a primary shaft 12, a first stage shaft 14, a quill shaft 16, a compressor stub shaft 18, and a bearing spacer 20. Portions of this rotating structure are supported by a plurality of bearings 22, 24, 26. Bearings 22 and 24 support the quill shaft 16 and bearing 26 supports the compressor stub shaft 18. Each of the bearings 22, 24, 26 can receive a stream of lubricant for cooling and lubrication in a manner consistent with prior-known lubrication systems or consistent with lubrication systems subsequently developed.

The turbine engine 10 also includes a sump housing 28 for collecting lubricant from the rotating structure. The sump housing 28 encircles the quill shaft 16, the compressor stub shaft 18, the bearing spacer 20, and the bearings 22, 24, 26. At the forward end, the sump housing 28 is engaged with housing 30 of an accessory drive 32. The housing 30 includes structure that extends into the sump housing 28 and supports the bearings 22 and 24. At the aft end, a seal runner 34 seals the sump housing 28 with respect to the rotating structure. In the exemplary embodiment of the invention, the seal runner 34 seals the sump housing 28 by engaging the compressor stub shaft 18. In alternative embodiments of the invention, the seal runner 34 could seal the sump housing 28 with respect to some rotating structure other than the compressor stub shaft 18. The seal runner 34 rotates with the compressor stub shaft 18.

Lubricant can move from the rotating structure and reach the sump housing 28 with relatively high-momentum or with relatively low-momentum. For example, each of the bearings 22, 24, 26 can pass low-momentum lubricant to the sump housing 28 and the seal runner 34 can eject high-momentum lubricant to the sump housing 28 due to high rotational speed of the rotating structure. Each of the bearings 22, 24, 26 can have a rotatable inner race engaged with the rotating structure and a stationary outer race fixed with respect to the sump housing 28. Typically, lubricant is injected between the races to rollers (balls or cylinders) and then passes radially outward toward the sump housing 28. The path followed by the lubricant from the bearings 22, 24, 26 can be torturous. In other words, a straight and unobstructed path does not always exist between the point where the lubricant leaves the rollers of each bearing 22, 24, 26 and the inner surface 76 of the sump housing 28. Direction arrows 36, 38, 40, 42 in FIG. 2 show possible paths of lubricant movement from the bearings 22, 24, 26. Each change of direction results in a loss of momentum for the lubricant. Therefore, the lubricant passing from the bearings 22, 24, 26 reaches the sump housing 28 with relatively low-momentum. A quantity 72 of lubricant is shown schematically in FIG. 2, disposed on a portion 74 of the inner surface 76. The quantity 72 of lubricant has relatively low momentum.

The seal runner 34 also receives lubricant. Lubricant can be ejected from a tip 44 of the seal runner 34 in a direction represented by arrow 46. An unobstructed path exists between the seal runner 34 and the sump housing 28 and, therefore, the lubricant ejected from the tip 44 reaches the sump housing 28 with relatively high-momentum. A quantity 78 of lubricant is shown schematically in FIG. 2 and is disposed on a portion 80 of the inner surface 76. The quantity 78 of lubricant has relatively high momentum. The momentum of the quantity 78 is greater than the momentum of the quantity 72.

The present invention provides a structural arrangement and method that capitalizes on the differences in momentum between the quantities 72, 78 of lubricant. The method includes the step of separating the interior of the sump housing 28 into a plurality of chambers with at least one dynamic seal 48 to isolate low-momentum and high-momentum flows from one another. The at least one dynamic seal 48 extends between the sump housing 28 and the rotating structure. The seal 48 is positioned to keep the low momentum flow from mixing with the high momentum flow. In the exemplary embodiment of the invention, the dynamic seal 48 extends between a supporting structure 82 fixed with respect to the sump housing 28 and the bearing spacer 20. The seal 48 separates the sump housing 28 into a plurality of chambers along an axis 54 of rotation of the rotating structure. In alternative embodiments of the invention, a dynamic seal could extend between the sump housing 28 and rotating structures other than a bearing spacer. Also, alternative embodiments of the invention could include more than one dynamic seal. As set forth in greater detail below, the present invention capitalizes on the differences in momentum between the flows of lubrication to more effectively scavenge lubricant from the sump housing 28.

As set forth above, the present invention capitalizes on the differences in momentum between the flows of lubrication to more effectively scavenge lubricant from the sump housing 28. The momentum of the high-momentum flow is not allowed to dissipate through co-mingling with the low-momentum flow. As best shown schematically in FIG. 2, a first exit port 50 is disposed on a first fluid side 84 of the sump housing 28 with the seal runner 34 for communicating the high-momentum lubricant flow out of the sump housing 28. A second exit port 52 is disposed on a second fluid side 86 of the sump housing 28 with the bearings 22, 24, 26 for communicating the low-momentum lubricant flow out of the sump housing 28. The first exit port 50 and the second exit port 52 are sealed from one another by the at least one dynamic seal 48.

Figure 7:
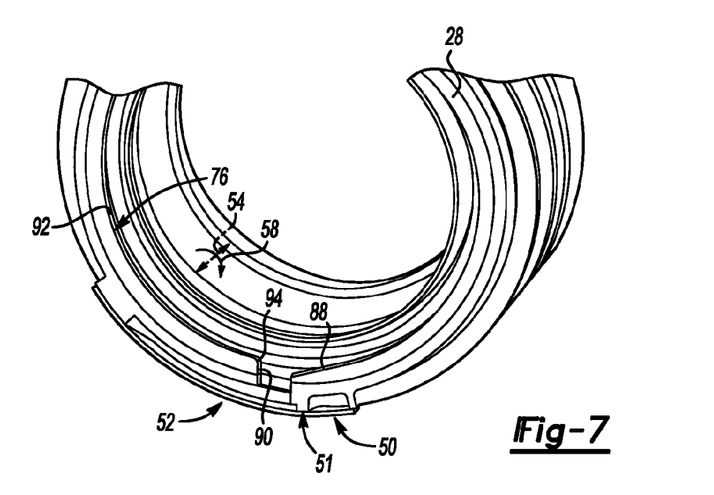
FIG. 7 is a perspective view of the first exemplary embodiment of the invention with the rotating structure removed and the sump housing cut-away along its longitudinal axis to show the separate exit points for the flows of high momentum lubricant flow and low momentum lubricant flow.
Figure 8:
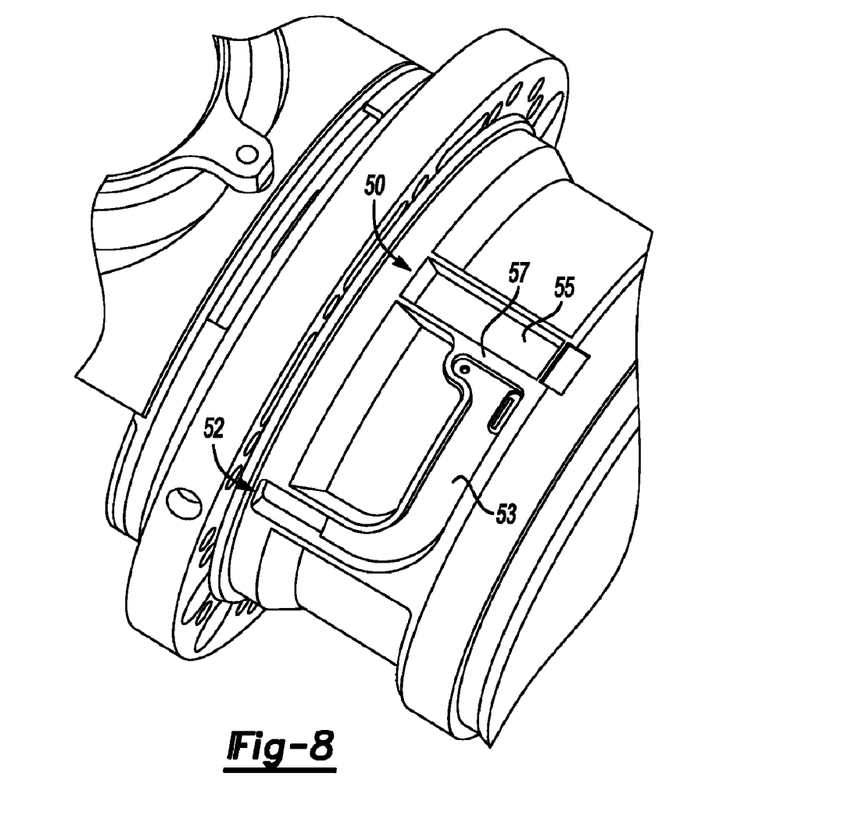
FIG. 8 is a perspective view with an outer portion of the sump housing cut-away to show separate flow paths for high momentum lubricant flow and low momentum lubricant flow out of the sump housing.

The exit ports 50, 52 are shown schematically in FIG. 2; FIGS. 7 and 8 provide more precise structural arrangements possible in exemplary embodiments of the invention. In FIG. 7, the rotating structure has been removed to enhance the clarity of the Figure. The exit ports 50, 52 are both proximate to bottom dead center but are separated from one another by a wall 51. In FIG. 8, the exit ports 50, 52 are radially separated further from one another than the arrangement shown in FIG. 7. FIG. 8 shows separate lubricant flow paths wherein the exit port 52 drains into a fluid passageway 53 and the exit port 50 drains into a fluid passageway 55. The passageways 53, 55 are separated from one another by a wall 57. FIGS. 7 and 8 demonstrate that the flows of lubricant are maintained separate from one another during scavenge from the sump housing 28.

FIG. 7 also shows that a structural arrangement of the port 52 includes a first and second circumferential portions 88, 90 of the inner surface 76. The inner surface 76 includes the first and second circumferential portions 88, 90 as well as a third circumferential portion 92. The third circumferential portion 92 extends about the axis 54 in a circular path between the first circumferential portion 88 and the second circumferential portion 90. The first circumferential portion 88 diverges from the circular path to a straight path that is substantially tangent to the circular path at the point where first circumferential portion 88 intersects the third circumferential portion 92. The first circumferential portion 88 extends from the third circumferential portion 92 in the direction that the rotating structure will rotate, represented by arrow 58. The second circumferential portion 90 diverges from the circular path to a straight path that is substantially perpendicular to the circular path. A rounded edge 94 extends between the third circumferential portion 92 and the second circumferential portion 90. The structural arrangement of the port 52 enhances lubricant flow out of the sump housing 28. Lubricant driven by windage can travel along the first circumferential portion 88 and exit out of the sump housing 28, while the windage is more likely to pass the port 52 and continue circling the interior of the sump housing 28. If a scavenge pump is in fluid communication with the exit port 52, the structural arrangement described above makes it less likely that moving air will compete with lubricant for the capacity of the pump.

The invention is not limited to the exemplary structural arrangement. The invention can be practiced wherein the separating step of the method is more generally defined as locating the at least one dynamic seal 48 in the sump housing 28 to separate a first region of the interior in which a substantially unobstructed radial gap exists between the sump housing 28 and the rotating structure from a second region of the interior in which a tortuous path extends radially outward from the rotating structure to the sump housing 28. The unobstructed radial gap need not exist between a seal runner and the sump housing 28, but could exist from some other structure and the sump housing 28. Similarly, the tortuous path need not extend radially outward from an inner race of a bearing and the sump housing 28, but could extend from some other structure and the sump housing 28.

The invention can also be practiced wherein the separating step of the method is more generally defined as locating the at least one dynamic seal 48 in the sump housing 28 to isolate a first region of the interior in which a ratio of an inner diameter of the sump housing 28 to a diameter of the rotating structure is a first number between 1.1 and 2 from a second region of the interior in which the ratio of the inner diameter of the sump housing 28 to the diameter of the rotating structure is a second number greater than the first number. Generally, as the ratio of the sump inner wall diameter to the shaft diameter (sump inner wall diameter/shaft diameter) decreases and approaches 1, high speed flow driven by shaft windage tends to become predominate in terms of the forces acting on the lubricant. In some operating environments, some form of shoulder may define a first region with a relatively low ratio from a second region with a higher ratio. Generally, lubricant in the low ratio region will have greater momentum than lubricant in the high ratio region. Sealing the regions from one another will prevent the momentum of the high-momentum flow to dissipate through co-mingling with low-momentum flow.

Figure 9:
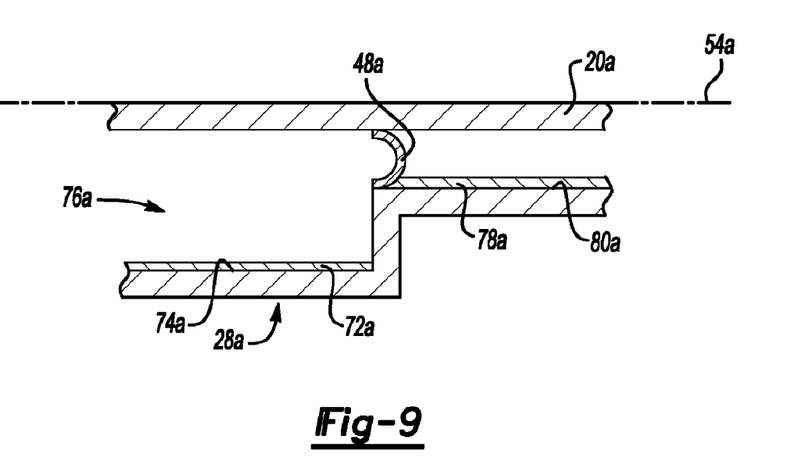
FIG. 9 is a simplified schematic diagram of an alternative embodiment of the invention.

FIG. 9 shows an alternative embodiment of the invention wherein the operating environment defines more than one ratio between the sump inner wall diameter to the shaft diameter. FIG. 9 is a simplified schematic diagram showing a rotating structure in the form of a shaft 20a rotatable about an axis 54a. A sump housing 28a encircles the shaft 20a and includes an inner surface 76a with portions 74a and 80a. The ratio of the sump inner wall diameter at the to the shaft diameter at the portion 80a is less than the ratio at the portion 74a. As result, lubricant 78a has a greater momentum than lubricant 72a. Seal 48a separates the lubricant 78a from the lubricant 72a.

Referring now to FIGS. 1-6B, the sump housing 28 of the exemplary embodiment of the invention also includes an inwardly-facing surface 56 that extends at least partially about the axis 54 in a spiral path increasing in radial distance from the axis 54 along the direction that the rotating direction rotates, represented by arrow 58 of the structure. The path is spiral in a plane perpendicular to the axis 54. As best shown in FIGS. 3-6B, the exemplary inwardly-facing surface 56 extends 360° about the seal runner along a spiral path, providing gentle path along which lubricant can move to the exit port 50. The shape of the surface 56 promotes the movement of lubricant without momentum loss. Alternative embodiments of the invention could include a spiral inwardly-facing surface extending only partially about the axis 54, such as between 180° and 360° or between 90° and 180° or between 1° and 90°. In further alternative embodiments of the invention, the surface 56 could extend beyond 360° if desired.

The exemplary spiral path of the inwardly-facing surface 56 includes a radially minimum position represented by point 56a that is substantially at bottom dead center of the sump housing 28 and a radially maximum position represented by point 56b that is substantially at bottom dead center. Thus, the points 56a and 56b are in the same plane containing the axis 54. In alternative embodiments of the invention, the maximum and minimum radial positions could be disposed at positions other than bottom dead center and could be disposed in different planes relative to the axis 54.

In one exemplary embodiment of the invention, shown in FIGS. 3-6B, the inwardly-facing surface 56 defines a bottom of a channel cross-section 60 in a plane containing the axis 54. The channel cross-section 60 includes side walls 62, 64 on opposite sides of a bottom defined by the surface 56. As shown best by a comparison between FIGS. 6A and 6B, the respective heights of the walls 62, 64 increase as spiral path extends in the rotational direction 58. The height 66c of the wall 62 is defined in the plane containing the point 56c and the axis 54, shown in FIG. 6B. The height 66c is greater than the height 66a of the wall 62 at the portion of the surface 56 containing the point 56a, shown in FIG. 6A. The height 66c of the wall 62 is less than the height 66b of the wall 62 at the portion of the surface 56 containing the point 56b. Similarly, the height 68b of the exemplary wall 64 is greatest at the portion of the surface 56 containing the point 56b, smallest at the portion of the surface 56 containing the point 56a, and intermediary in the plane containing the point 56c and the axis 54.

Figures 6A, 6B:
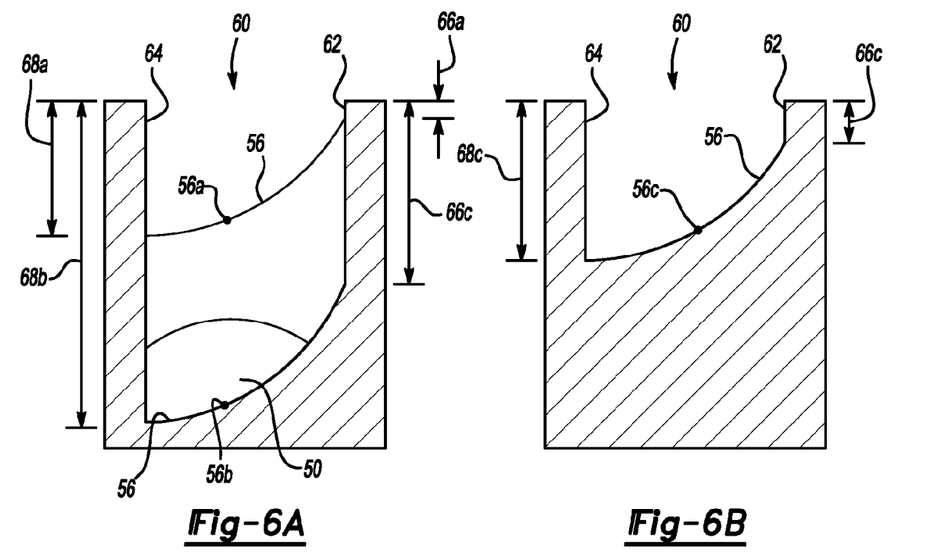
FIG. 6A is a partial cross-sectional view of the scroll device taken along section lines 6A-6A in FIG. 3.
FIG. 6B is a partial cross-sectional view of the scroll device taken along section lines 6B-6B in FIG. 3.

In any single cross-section, the exemplary channel cross-section 60 narrows with increasing depth. In other words, in any single cross-section, the wall 64 has greater height than the wall 62 because the inwardly-facing surface 56 increases in radial distance from the axis 54 in an axial direction away from the seal runner 34. Thus, the exemplary surface 56 is both spiraling away from the axis 54 in a plane normal to the axis 54 and also diverging away from the axis 54 in a plane containing the axis 54. The inwardly-facing surface 56 thus appears substantially conical in any single particular cross-section in a plane containing the axis 54. However, cumulatively, the inwardly-facing surface 56 is not conical. Thus, the channel cross-section 60 is asymmetrical, oriented away from the seal runner 34 in order to accumulate lubricant into a stream and to direct the lubricant along the axis and into the stream. The channel cross-section 60 thus begins to narrow beginning at the intersection of the wall 62 and the surface 56. This feature defines a banking surface that gently urges the lubricant to collect along a desired position along the axis 54.

The figures of the application show two embodiments of the inwardly-facing surface 56. FIGS. 1 and 2 show an embodiment wherein the sump housing 28 includes a first body 68 encircling a first portion of the rotating structure and a second body 70 encircling a second portion of the rotating structure. The first body defines the surface 56. The first and second bodies 68, 70 are connected to one another to form the sump housing 28. As a result, the inwardly-facing surface 56 is integrally formed with respect to a portion of the sump housing 28. FIGS. 3-6B show a second embodiment of the invention wherein the inwardly-facing surface is defined by an insert 66 positionable in a body of the sump housing 28. The feature defining the inward facing surface could also be integrally cast or machined, doesn't have to be a separable insert.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lubrication scavenge system comprising:
   a structure disposed for rotation about an axis and subjected to lubrication;
   a sump housing having an inner surface substantially encircling said structure;
   a first quantity of lubricant disposed on said inner surface having a first level of momentum;
   a second quantity of lubricant disposed on said inner surface spaced axially from said first quantity and having a second level of momentum less than said first level of momentum; and
   at least one dynamic seal extending radially between said sump housing and said structure and disposed along said axis between said first quantity of lubricant and said second quantity of lubricant to isolate said first and second quantities of lubricant from one another.

2. The lubrication scavenge system of claim 1 further comprising:
   a first exit port disposed in said sump housing for communicating said first quantity of lubricant out of said sump housing; and
   a second exit port disposed in said sump housing for communicating said second quantity of lubricant out of said sump housing, wherein said first exit port and said second exit port are sealed from one another by said at least one dynamic seal.

3. The lubrication scavenge system of claim 1 further comprising:
   an unobstructed path extending radially outward between said structure and said inner surface wherein said first quantity of lubricant moves along said unobstructed path; and
   a torturous path extending radially outward between said structure and said second quantity of lubricant wherein said second quantity of lubricant moves along said torturous path.

4. The lubrication scavenge system of claim 3 further comprising:
   a seal runner sealing said sump housing with respect to structure and fixed with said structure for rotation wherein said unobstructed path extends radially outward from said seal runner; and
   a bearing having a rotatable inner race engaged with said structure and a stationary outer race fixed with respect to said sump housing and a rolling element disposed between said inner race and said outer race wherein said torturous path extends from said rollers at least partially around said outer race.

5. The lubrication scavenge system of claim 1 wherein said inner surface further comprises:
 a first portion disposed a first radial distance from said axis and wherein said first quantity of lubricant is disposed on said first portion; and
 a second portion disposed a second radial distance from said axis greater than said first radial distance wherein said second quantity of lubricant is disposed on said second portion.

6. The lubrication scavenge system of claim 1 wherein said at least one dynamic seal is positioned in said sump housing to isolate a first region of an interior of said sump housing in which a ratio of an inner diameter of said sump housing to a diameter of said rotating structure is a first number substantially from 1.1 to about 2 from a second region of said interior in which a ratio of said inner diameter of the sump housing to said diameter of said rotating structure is a second number greater than the first number.

\* \* \* \* \*